US012610370B2

(12) United States Patent
Ryu et al.

(10) Patent No.: US 12,610,370 B2
(45) Date of Patent: Apr. 21, 2026

(54) TWO-STAGE PDCCH WITH DYNAMIC DCI SIZE INDICATION

(71) Applicant: QUALCOMM Incorporated, San Diego, CA (US)

(72) Inventors: Jae Ho Ryu, San Diego, CA (US); Kazuki Takeda, Minato-ku (JP); Hobin Kim, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 18/172,778

(22) Filed: Feb. 22, 2023

(65) Prior Publication Data

US 2024/0284472 A1 Aug. 22, 2024

(51) Int. Cl.
*H04W 72/23* (2023.01)
*H04W 28/06* (2009.01)
*H04W 72/231* (2023.01)

(52) U.S. Cl.
CPC ......... *H04W 72/231* (2023.01); *H04W 28/06* (2013.01)

(58) Field of Classification Search
CPC ............... H04W 28/06; H04W 72/231; H04W 72/1289; H04W 72/1273; H04W 72/128; H04W 72/127; H04L 5/0007; H04L 5/0094; H04L 5/0044
See application file for complete search history.

(56) References Cited

U.S. PATENT DOCUMENTS

| | | | | |
|---|---|---|---|---|
| 2019/0253986 A1* | 8/2019 | Jeon | ..................... | H04L 5/0048 |
| 2019/0342907 A1* | 11/2019 | Huang | ................. | H04W 72/23 |
| 2020/0187236 A1* | 6/2020 | Moon | ....................... | H04L 1/00 |
| 2020/0396760 A1 | 12/2020 | Yi et al. | | |
| 2022/0408458 A1 | 12/2022 | Molavianjazi et al. | | |
| 2024/0284484 A1* | 8/2024 | Zhang | .................. | H04L 1/0061 |
| 2024/0421957 A1* | 12/2024 | Koskela | ............... | H04L 5/0094 |

OTHER PUBLICATIONS

China Telecom: "Discussion on multi-cell scheduling with a single DCI", 3GPP TSG RAN WG1 #109-e, R1-2203664, 3rd Generation Partnership Project (3GPP), Mobile Competence Centre, 650, Route Des Lucioles, F-06921 Sophia-Antipolis Cedex, France, vol. RAN WG1, No. e -Meeting, May 9, 2022-May 20, 2022, Apr. 29, 2022, 5 Pages, XP052153104, p. 2-p. 3, figure 2.
International Search Report and Written Opinion—PCT/US2024/012434—ISA/EPO—May 7, 2024.

* cited by examiner

*Primary Examiner* — Wei Zhao
(74) *Attorney, Agent, or Firm* — Procopio, Cory, Hargreaves & Savitch LLP

(57) ABSTRACT

Method and apparatus for two-stage PDCCH with dynamic DCI size indication. The apparatus receives DCI including a first DCI portion comprising an indication indicating a size of a second DCI portion, and the second DCI portion having the size based on the indication in the first DCI portion. The apparatus transmits or receives communication with a network entity using resources scheduled in the second DCI portion. The apparatus receives RRC signaling indicating a first DCI size of the first DCI portion from a defined set of sizes.

30 Claims, 14 Drawing Sheets

410

400

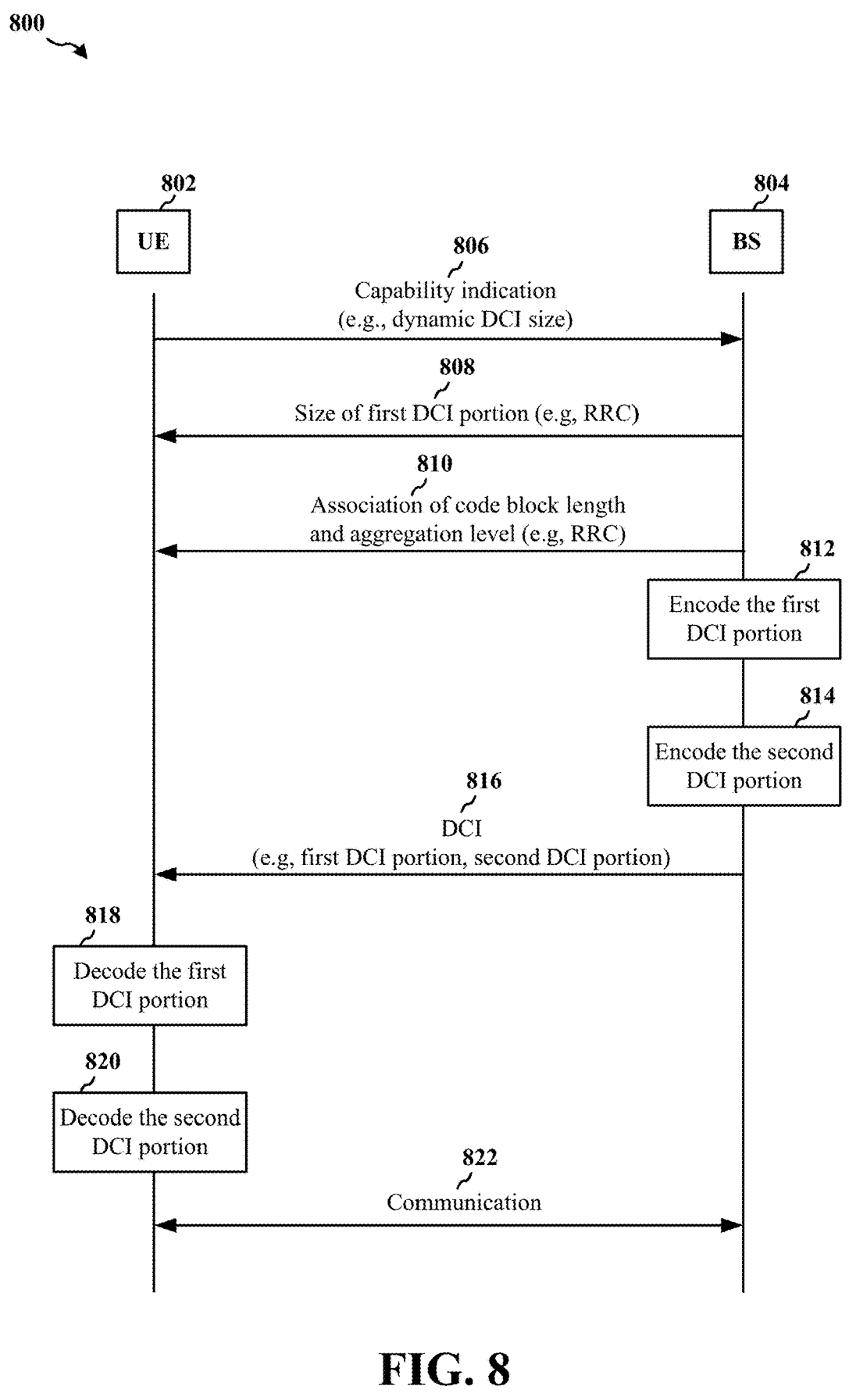

800

802

UE

804

BS

806

Capability indication
(e.g., dynamic DCI size)

808

Size of first DCI portion (e.g, RRC)

810

Association of code block length
and aggregation level (e.g, RRC)

812

Encode the first
DCI portion

814

Encode the second
DCI portion

816

DCI
(e.g, first DCI portion, second DCI portion)

818

Decode the first
DCI portion

820

Decode the second
DCI portion

822

Communication

FIG. 8

902 receive DCI including a first DCI portion comprising an indication indicating a size of a second DCI portion, and the second DCI portion having the size based on the indication in the first DCI portion

904 transmit or receive communication with a network node using resources scheduled in the second DCI portion

900

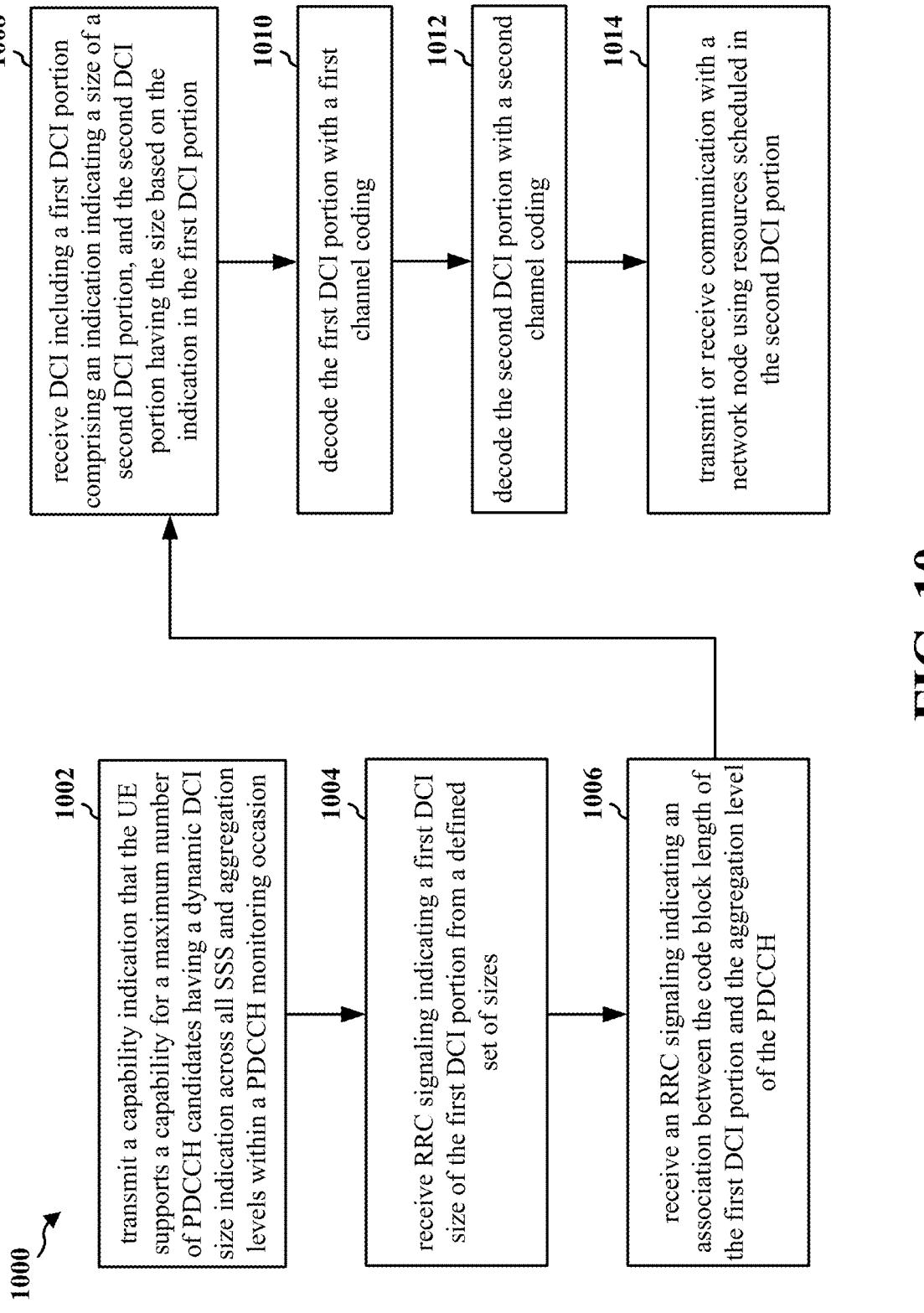

1000

1002
transmit a capability indication that the UE supports a capability for a maximum number of PDCCH candidates having a dynamic DCI size indication across all SSS and aggregation levels within a PDCCH monitoring occasion

1004
receive RRC signaling indicating a first DCI size of the first DCI portion from a defined set of sizes

1006
receive an RRC signaling indicating an association between the code block length of the first DCI portion and the aggregation level of the PDCCH

1008
receive DCI including a first DCI portion comprising an indication indicating a size of a second DCI portion, and the second DCI portion having the size based on the indication in the first DCI portion

1010
decode the first DCI portion with a first channel coding

1012
decode the second DCI portion with a second channel coding

1014
transmit or receive communication with a network node using resources scheduled in the second DCI portion

FIG. 10

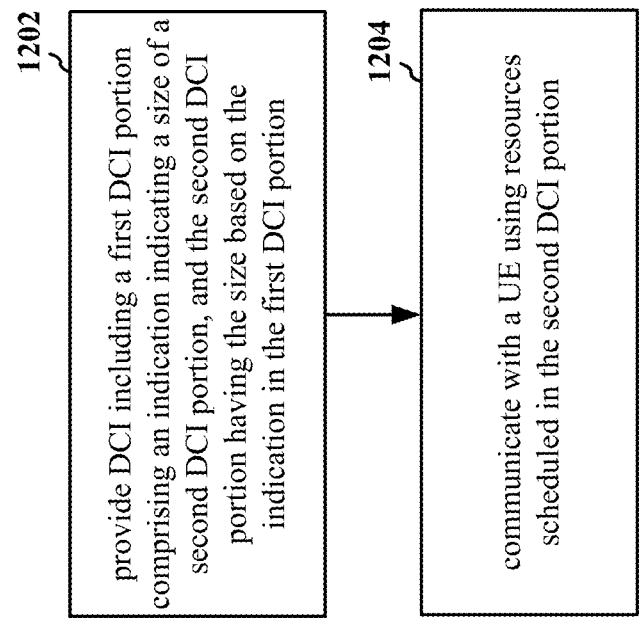
1202
provide DCI including a first DCI portion comprising an indication indicating a size of a second DCI portion, and the second DCI portion having the size based on the indication in the first DCI portion
1204
communicate with a UE using resources scheduled in the second DCI portion
1200
FIG. 12

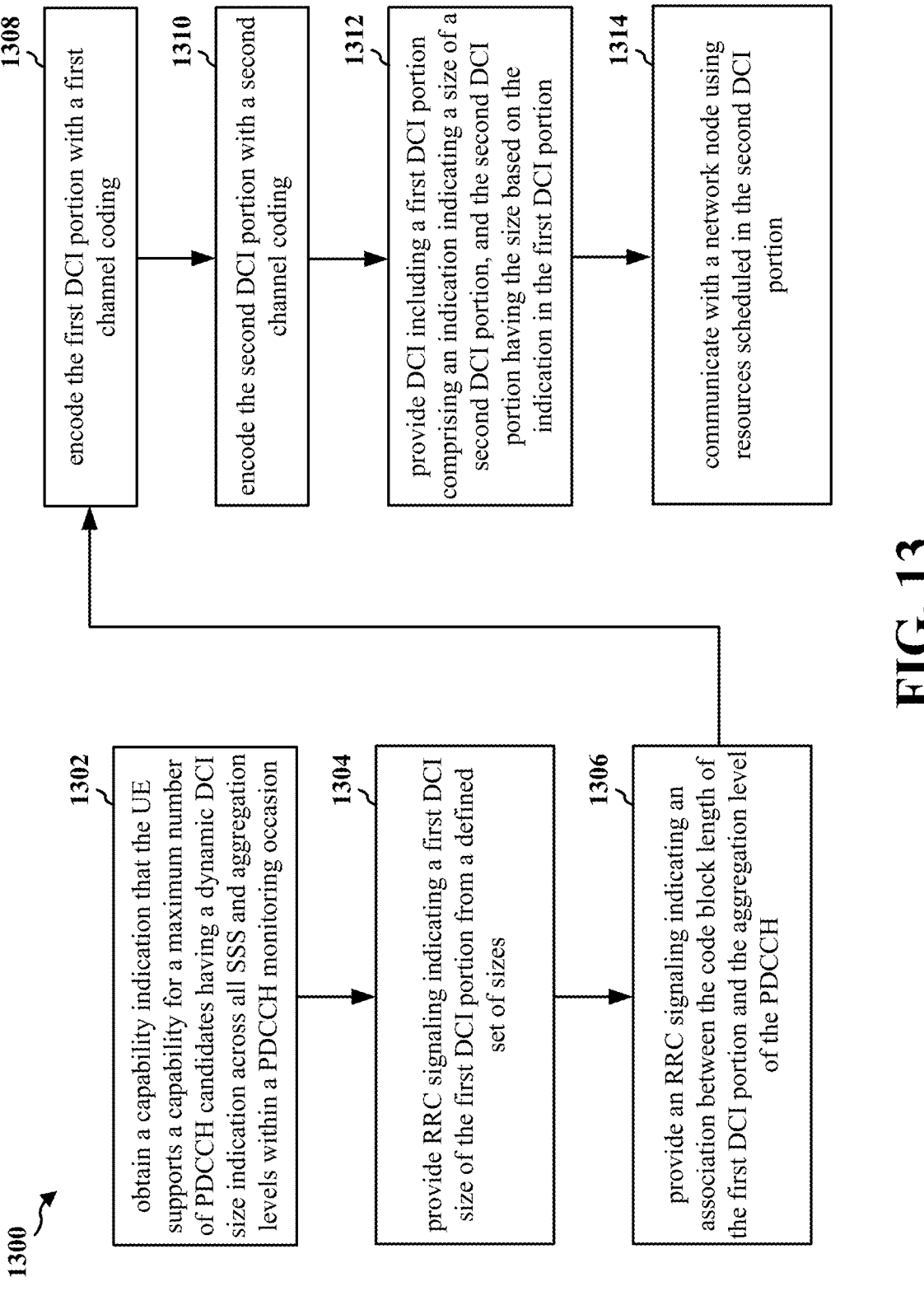

1300

1302 obtain a capability indication that the UE supports a capability for a maximum number of PDCCH candidates having a dynamic DCI size indication across all SSS and aggregation levels within a PDCCH monitoring occasion 1304 provide RRC signaling indicating a first DCI size of the first DCI portion from a defined set of sizes 1306 provide an RRC signaling indicating an association between the code block length of the first DCI portion and the aggregation level of the PDCCH 1308 encode the first DCI portion with a first channel coding 1310 encode the second DCI portion with a second channel coding 1312 provide DCI including a first DCI portion comprising an indication indicating a size of a second DCI portion, and the second DCI portion having the size based on the indication in the first DCI portion 1314 communicate with a network node using resources scheduled in the second DCI portion

FIG. 13

TWO-STAGE PDCCH WITH DYNAMIC DCI SIZE INDICATION

TECHNICAL FIELD

The present disclosure relates generally to communication systems, and more particularly, to a configuration for two-stage physical downlink control channel (PDCCH) with a dynamic downlink control information (DCI) size indication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a user equipment (UE). The device may be a processor and/or a modem at a UE or the UE itself. The apparatus receives downlink control information (DCI) including a first DCI portion comprising an indication indicating a size of a second DCI portion, and the second DCI portion having the size based on the indication in the first DCI portion. The apparatus transmits or receives communication with a network entity using resources scheduled in the second DCI portion.

In an aspect of the disclosure, a method, a computer-readable medium, and an apparatus are provided. The apparatus may be a device at a network node. The device may be a processor and/or a modem at a network node or the network node itself. The apparatus provides downlink control information (DCI) including a first DCI portion comprising an indication indicating a size of a second DCI portion, and the second DCI portion having the size based on the indication in the first DCI portion. The apparatus communicates with a user equipment (UE) using resources scheduled in the second DCI portion.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a call flow diagram of signaling between a UE and a base station.

FIG. 10 is a flowchart of a method of wireless communication.

FIG. 12 is a flowchart of a method of wireless communication.

FIG. 13 is a flowchart of a method of wireless communication.

DETAILED DESCRIPTION

Figure 1:
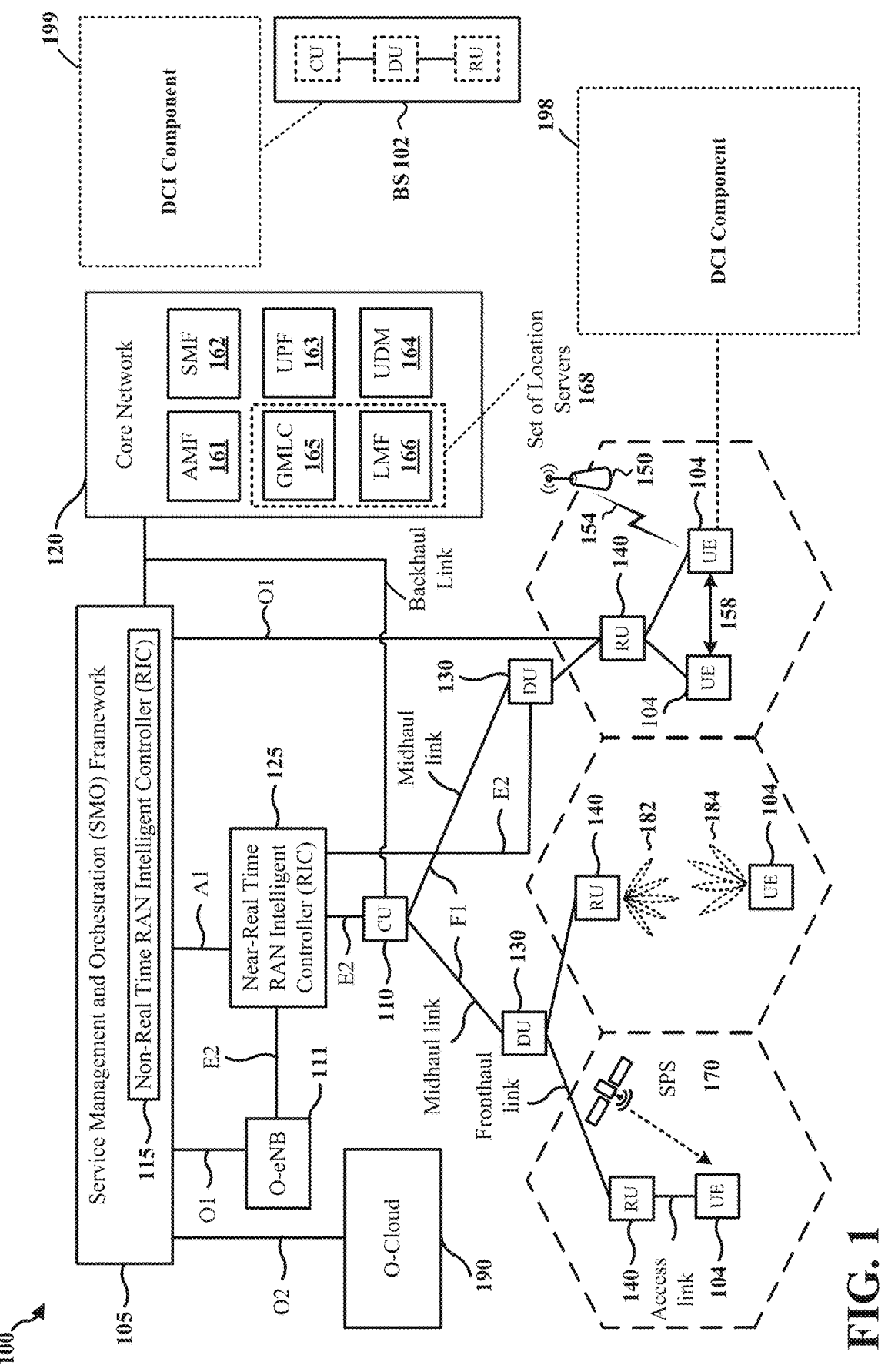
FIG. 1 is a diagram illustrating an example of a wireless communications system and an access network.

Wireless communication systems may be configured with multi-cell PUSCH/PDSCH scheduling such that multi-cell PUSCH/PDSCH scheduling may be done via a single DCI. For example, a DCI format 0_X may schedule PUSCH(s) on up to four cells, while DCI format 1_X may schedule PDSCH(s) on up to four cells. However, the number of scheduled cells may vary dynamically according to channel or traffic conditions. For example, DCI size of DCI format 0_X/1_X may be based on a maximum number of co-scheduled cells, which may be configured via RRC signaling. In addition, when the number of co-scheduled cells is small, DCI fields corresponding to un-scheduled cells may be wasted or inefficiently utilized. Efficiency may improve in instances where the DCI size may be dynamically adjusted based on number of actually co-scheduled cells.

Aspects presented herein provide a configuration for two-stage PDCCH with a dynamic DCI size indication. A UE may receive a DCI having a first DCI portion and a second DCI portion, where the first DCI portion comprises an indication that indicates a size of the second DCI portion, such that the UE transmits or receives communications with a base station based on resources scheduled in the second DCI portion. At least one advantage of the disclosure is that the size of a DCI may be dynamically adjusted based on a number of cells that are scheduled together.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FRI and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a DCI component 198 configured to receive DCI including a first DCI portion comprising an indication indicating a size of a second DCI portion, and the second DCI portion having the size based on the indication in the first DCI portion; and transmit or receive communication with a network entity using resources scheduled in the second DCI portion.

Referring again to FIG. 1, in certain aspects, the base station 102 may comprise a DCI component 199 configured to provide DCI including a first DCI portion comprising an indication indicating a size of a second DCI portion, and the second DCI portion having the size based on the indication in the first DCI portion; and communicate with a UE using resources scheduled in the second DCI portion.

Although the following description may be focused on 5G NR, the concepts described herein may be applicable to other similar areas, such as LTE, LTE-A, CDMA, GSM, and other wireless technologies.

Figures 2A, 2B, 2C, 2D:
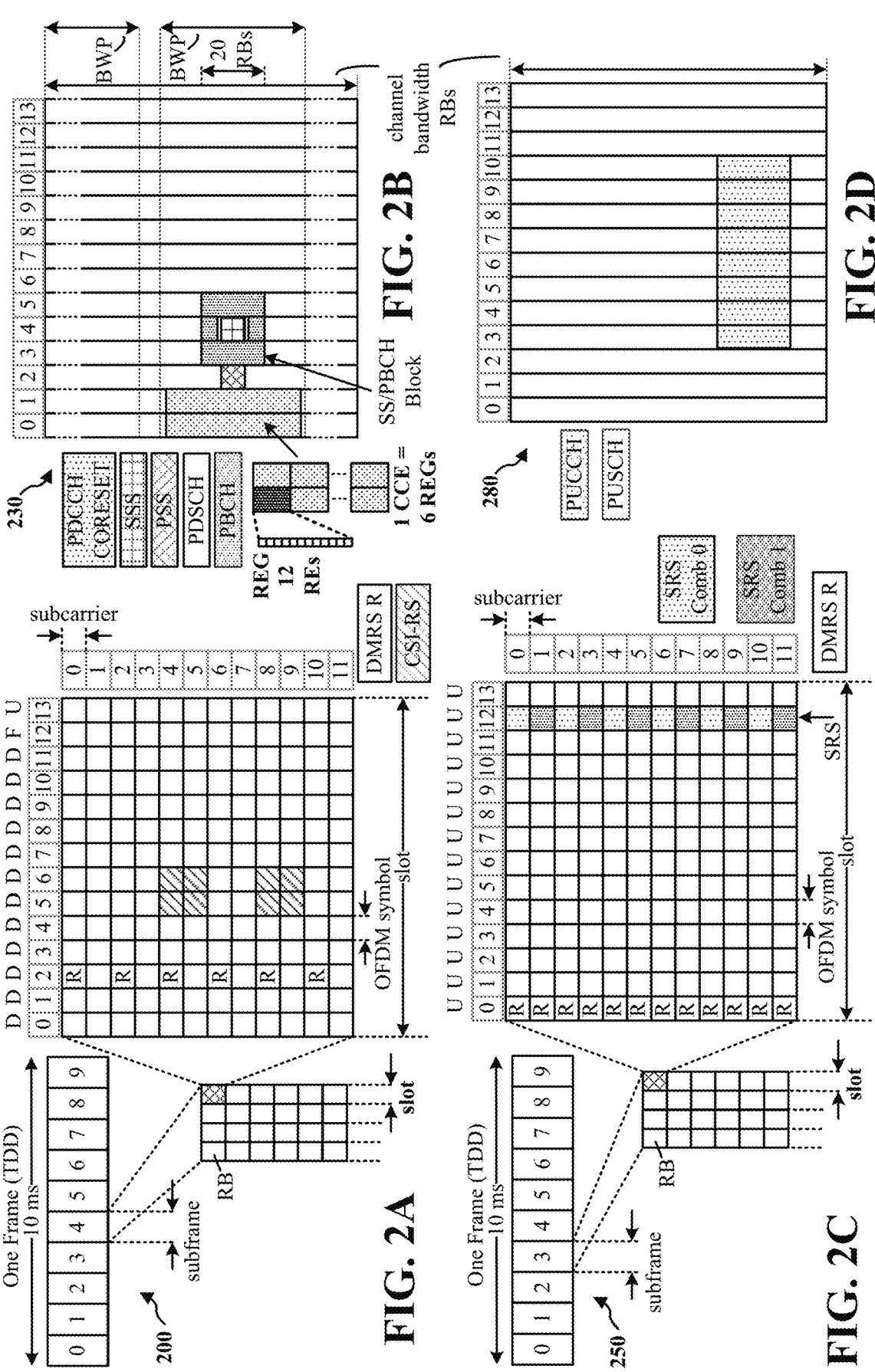
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^{\mu} \cdot 15[\text{kHz}]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
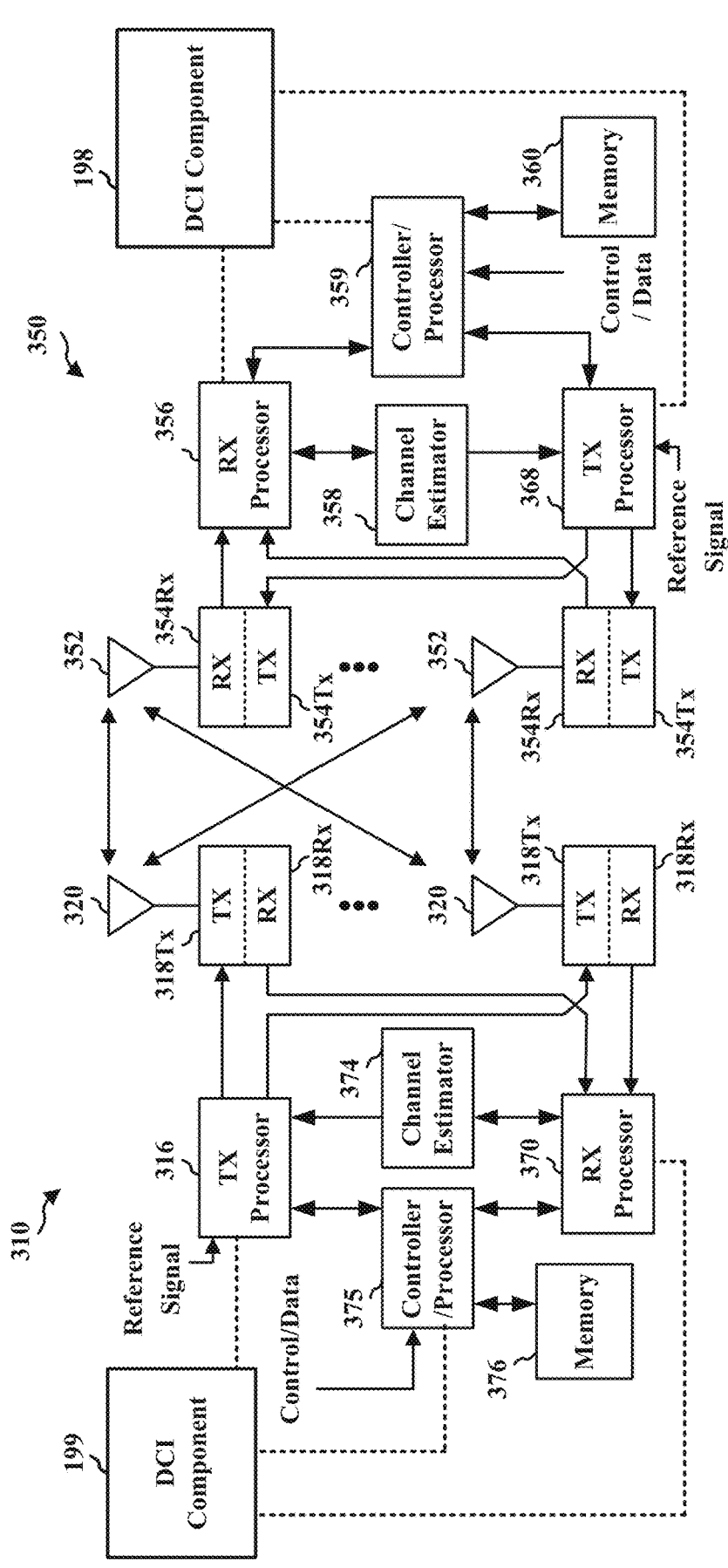
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the DCI component 198 of FIG. 1.

At least one of the TX processor 316, the RX processor 370, and the controller/processor 375 may be configured to perform aspects in connection with the DCI component 199 of FIG. 1.

Figure 4B:
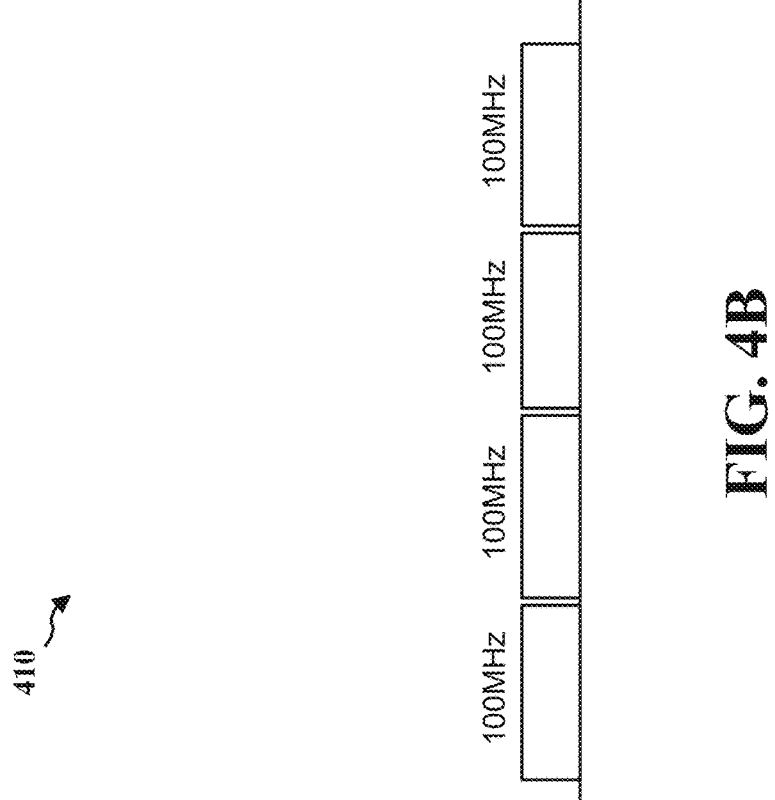
FIG. 4A-4B are diagrams illustrating examples of multi-cell scheduling.
Figure 4A:
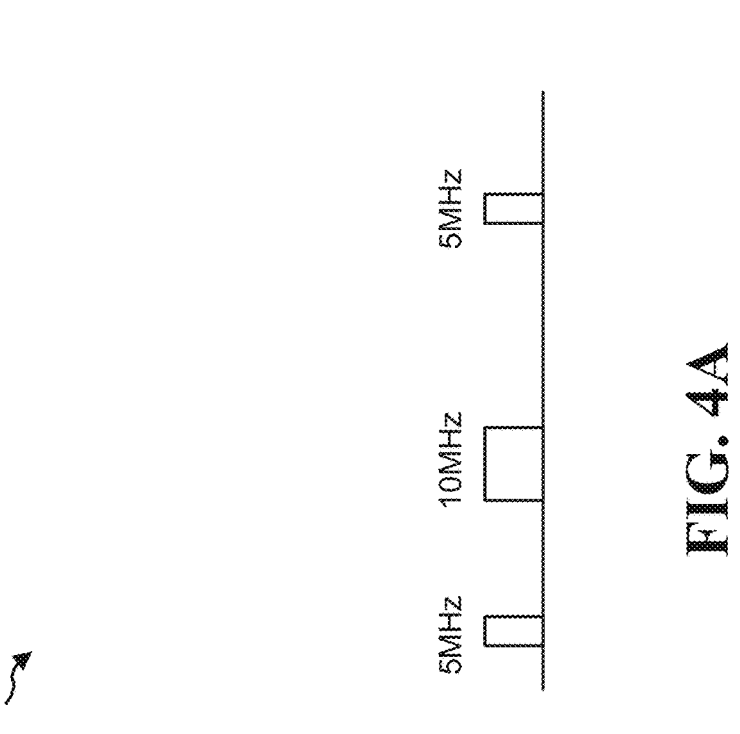

Wireless communication systems may be configured with multi-cell PUSCH/PDSCH scheduling such that multi-cell PUSCH/PDSCH scheduling may be done via a single DCI. For example, a DCI format 0_X may schedule PUSCH(s) on up to four cells, while DCI format 1_X may schedule PDSCH(s) on up to four cells, as shown for example in diagram 400 of FIG. 4A and diagram 410 of FIG. 4B. Frequency domain resource allocation (FDRA) may occur on a per-cell field, where different fields for different cells are co-scheduled by a DCI format 0_X or DCI format 1_X. Modulation and coding scheme (MCS), new data indicator (NDI), redundant version (RV), or HARQ process number may also occur on a per-cell fields. In some instances, antenna port(s) may be configurable between per-cell field or single-field (e.g., applied to all the co-scheduled cell(s)).

However, the number of scheduled cells may vary dynamically according to channel or traffic conditions. For example, DCI size of DCI format 0_X/1_X may be based on a maximum number of co-scheduled cells, which may be configured via RRC signaling. In addition, when the number of co-scheduled cells is small, DCI fields corresponding to un-scheduled cells may be wasted or inefficiently utilized. Efficiency may improve in instances where the DCI size may be dynamically adjusted based on number of actually co-scheduled cells.

Aspects presented herein provide a configuration for two-stage PDCCH with a dynamic DCI size indication. At least one advantage of the disclosure is that the size of a DCI may be dynamically adjusted based on a number of cells that are scheduled together.

In some aspects, a PDCCH may be comprised of two portions, where a first DCI portion indicates a DCI size and a second DCI portion comprises the actual DCI. The first DCI portion comprising information related to the DCI size may be a small size (e.g., M=1/2/3 bits). The DCI format with multiple DCI sizes may be configured by RRC configuration for a specific DCI format in a UE-specific search space (USS). In an example configuration for multi-cell scheduling where M=1, the first DCI portion may indicate a value of 0, while the second DCI portion size may be determined based on a scheduling of up to 4 cells. In another example configuration for multi-cell scheduling where M=1, the first DCI portion may indicate a value of 1, while the second DCI portion size may be determined based on a scheduling of up to 2 cells. In some aspects, the DCI configuration may specify multiple sizes for the first DCI portion, such that one size may be selected and configured via RRC signaling.

In some aspects, the first DCI portion and the second DCI portion may be encoded using separate channel coding techniques. For example, the first DCI portion may be encoded via small length block code (e.g., Reed-Muller code), while the second DCI portion may be encoded via polar code or any other channel coding that may be selected for downlink control channels.

Figure 5:
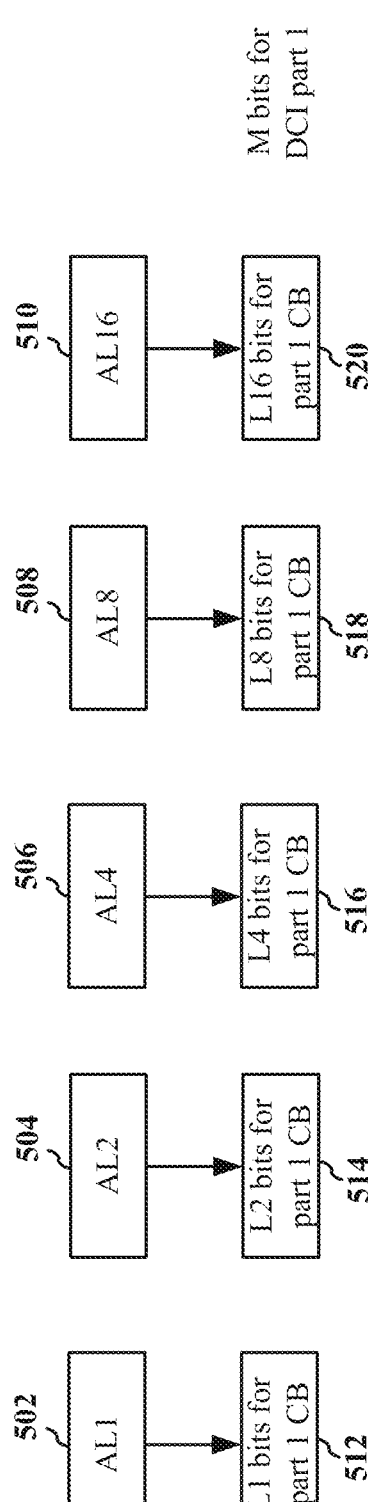
FIG. 5 is a diagram illustrating an example of an association of code block length and aggregation levels.

FIG. 5 provides a diagram 500 of an example of an association of code block length and aggregation levels. The diagram 500 includes multiple aggregation levels (e.g., 502, 504, 506, 508, 510) and associated code block lengths (e.g., 512, 514, 516, 518, 520). The design of the code block length for the first DCI portion may provide at least similar link performance as in the second DCI portion. PDCCH may be configured to support multiple aggregation levels to provide multiple link performance. A determination of the candidate block length for the first DCI portion may be based on an alignment of link performance between the first DCI portion and the second DCI portion. In some aspects, for a given M (e.g., first DCI portion size), multiple code block lengths may be provided in order to provide multiple link performances. The association of the first DCI portion code block length and the PDCCH aggregation level may be preconfigured to associate the first DCI portion code block length and the PDCCH aggregation level, or the base station may configure the association of the first DCI portion code book length and the PDCCH aggregation levels via RRC signaling.

Figure 6:
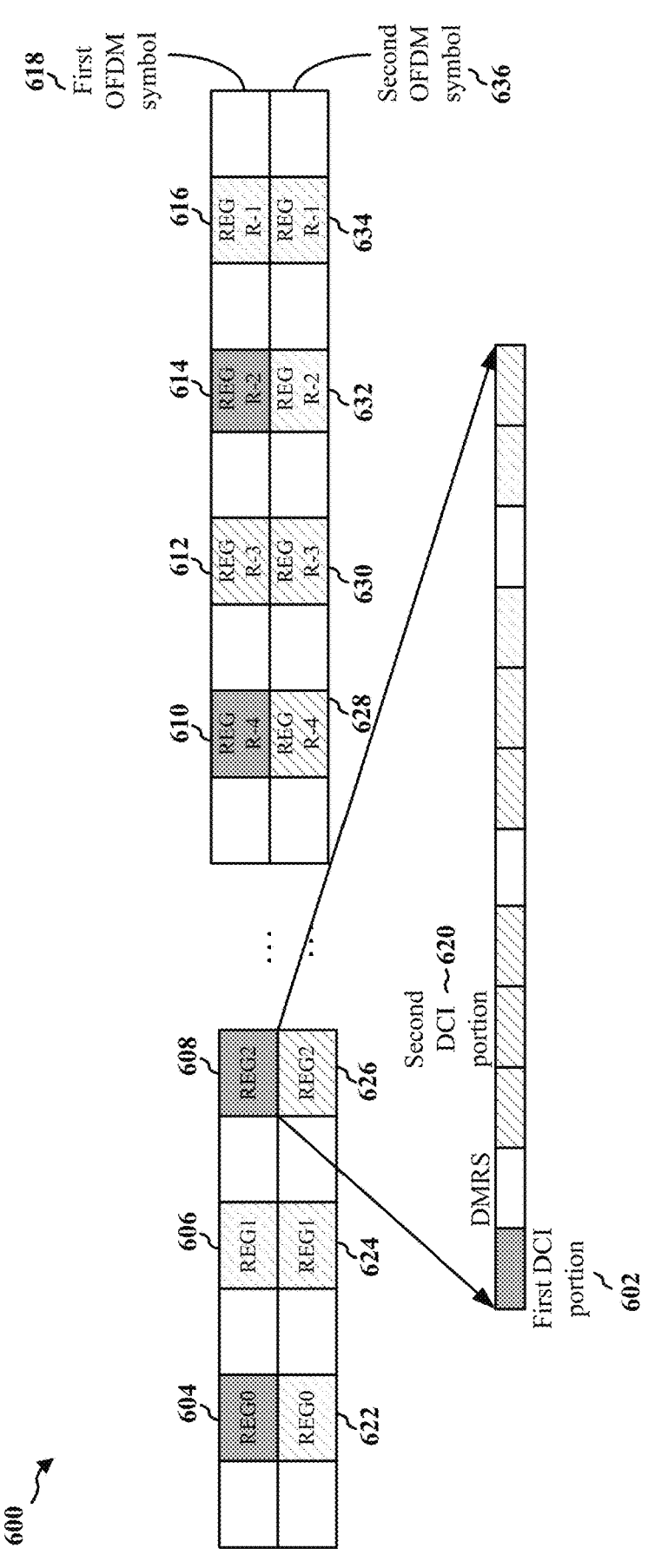
FIG. 6 is a diagram illustrating an example of resource mapping for a first DCI portion.

FIG. 6 provides a diagram 600 of an example of resource mapping for the first DCI portion. A resource mapping procedure for the first DCI portion may determine a number of modulated symbols K for the first DCI portion 602. For a given PDCCH candidate, the resource element groups (REGs) associated with the PDCCH candidate may be determined. In some aspects, if the number of REGs R (e.g., 604, 606, 608, 610, 612, 614, 616) on a first PDCCH symbol is larger than the number of modulated symbols K, then an allocation of K REGs on the first OFDM symbol 618 is determined. A REG spacing $$S = \left\lfloor \frac{R}{K} \right\rfloor$$

may then be determined, followed by determining K REGs for the first DCI portion assignment {0-th, S-th, 2S-th, . . . , (K−1)S-th} with uniform spacing. The k-th modulation symbol (e.g., k=0, 1, . . . K−1) may be modulated on the j-th tone on the k-th REG of the first OFDM symbol 618, where j may represent a fixed tone location for the first DCI portion within a REG, which may be preconfigured or configurable via RRC signaling.

Figure 7:
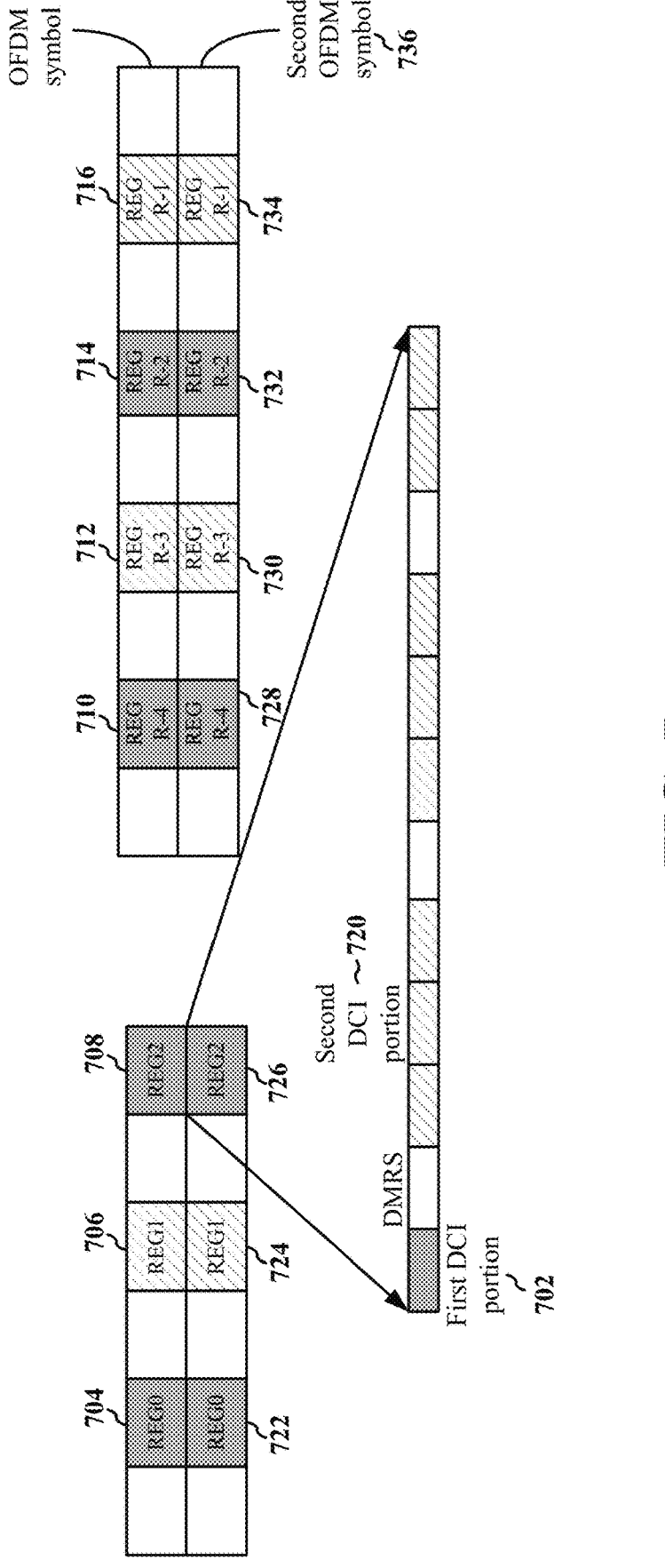
FIG. 7 is a diagram illustrating an example of resource mapping for a first DCI portion.

FIG. 7 provides a diagram 700 of another example of resource mapping for the first DCI portion 702. In some aspects, if the number of REGs R (e.g., 704, 706, 708, 710, 712, 714, 716) on the first PDCCH symbol is less than the number of modulated symbols K, but larger than K/2, the allocation of K/2 REGs on the first OFDM symbol 718 may be determined. A REG spacing of $$S = \left\lfloor \frac{2R}{K} \right\rfloor$$

may be determined followed by determining of K/2 REGs for the first DCI portion assignment {0-th, S-th, 2S-th, . . . (K/2−1)S-th} on the first 2 OFDM symbols. The first K/2 symbols (e.g., k=0, 1, . . . K/2−1) may be mapped on the i-th tone on the k-th REG of the first OFDM symbol. The remaining K/2 symbols (e.g., k=K/2, K/2+1, . . . , K−1) may be mapped on the j-th tone on the (k−K/2)-th REG of the second OFDM symbol 736, where i and j may represent fixed tone locations for the first DCI portion within a REG, which may be preconfigured or configurable via RRC signaling. The resource mapping for the second DCI portion (e.g., 620, 720) may comprise a mapping of modulated symbols for the second DCI portion on the remaining tones of the REGs (e.g., 622, 624, 626, 628, 630, 632, 634 of the second OFDM symbol 636, 722, 724, 726, 728, 730, 732, 734 of the second OFDM symbol 736) associated with the PDCCH candidate.

In some aspects, a UE may provide a capability indication indicating that the UE supports dynamic DCI size. For example, the UE may specify a capability N for the maximum number of PDCCH candidates having a dynamic DCI size indication. In some aspects, when the DCI format with dynamic DCI size monitoring is configured in SSS with slot-based PDCCH monitoring, the granularity of the capability may be on a per-slot basis. In some aspects, when the DCI format with dynamic DCI size monitoring is configured in SSS with span-based PDCCH monitoring, the granularity of the capability may be on a per-span basis. The UE capability N may be applied across all search space sets (SSSs) and/or across all aggregation levels within the monitoring occasion.

FIG. 8 is a call flow diagram 800 of signaling between a UE 802 and a base station 804. The base station 804 may be configured to provide at least one cell. The UE 802 may be configured to communicate with the base station 804. For example, in the context of FIG. 1, the base station 804 may correspond to base station 102 and the UE 802 may correspond to at least ULE 104. In another example, in the context of FIG. 3, the base station 804 may correspond to base station 310 and the UE 802 may correspond to UE 350.

At 806, the UE 802 may transmit a capability indication that the UE supports a capability for a maximum number of PDCCH candidates having a dynamic DCI size indication across all SSS and aggregation levels within a PDCCH monitoring occasion. The UE may transmit the capability indication that the UE supports a capability for a maximum number of PDCCH candidates having a dynamic DCI size indication across all SSS and aggregation levels within a PDCCH monitoring occasion to the base station 804. The base station 804 may receive the capability indication from the UE 802. In some aspects, the maximum number of the PDCCH candidates having the dynamic DCI size indication may be based on a period of time spanning a slot for slot based PDCCH monitoring, or a span for span based PDCCH monitoring.

At 808, the base station 804 may provide RRC signaling indicating a first DCI size of a first DCI portion. The first DCI size of the first DCI portion may be from a defined set of sizes. The base station 804 may provide the RRC signaling indicating the first DCI size of the first DCI portion to the UE 802. The UE 802 may receive the RRC signaling indicating the first DCI size of the first DCI portion from the base station 804.

At 810, the base station 804 may provide RRC signaling indicating an association between the code block length of the first DCI portion and the aggregation level of the PDCCH. The base station 804 may provide the RRC signaling indicating the associate between the code block length of the first DCI portion and the aggregation level of the PDCCH to the UE 802. The UE may receive the RRC signaling indicating the associate between the code block length of the first DCI portion and the aggregation level of the PDCCH from the base station 804. In some aspects, the RRC signaling may indicate at least one or both of the first DCI size of the first DCI portion and/or the association between the code block length of the first DCI and the aggregation level of the PDCCH. In some aspects, the first DCI portion may comprise a code block length from a set of multiple code block lengths based on an association to an aggregation level for a PDCCH. In some aspects, the code block length of the first DCI portion may be configured to provide a first link performance that corresponds to a second link performance of the second DCI portion. In some aspects, an association between the code block length of the first DCI portion and the aggregation level of the PDCCH is defined.

At 812, the base station 804 may encode the first DCI portion. The base station may encode the first DCI portion with a first channel coding.

At 814, the base station 804 may encode the second DCI portion. The base station may encode the second DCI portion with a second channel coding.

At 816, the base station 804 may provide DCI to the UE 802. The UE may receive the DCI from the base station 804. The DCI may include a first DCI portion and a second DCI portion. The first DCI portion may comprise an indication indicating a size of a second DCI portion. The second DCI portion may have the size based on the indication in the first DCI portion. In some aspects, the first DCI portion may have a fixed size and the second DCI portion may have a variable size based on the indication in the first DCI portion. The variable size may be based on a number of cells scheduled in the DCI. In some aspects, the first DCI portion may be mapped to resources based at least on a number of modulated symbols for the first DCI portion and resource element groups associated with a PDCCH candidate. In some aspects, a number of the resource element groups associated with the PDCCH candidate for mapping the first DCI portion may be selected from a first OFDM symbol within a PDCCH monitoring occasion. In some aspects, a number of the resource element groups associated with the PDCCH candidate for mapping the first DCI portion may be based on a spacing of the resource element groups. In some aspects, the second DCI portion may be mapped on remaining resources of the resource element groups associated with the PDCCH candidate after mapping the first DCI portion.

At 818, the UE 802 may decode the first DCI portion. The UE may decode the first DCI portion with a first channel coding.

At 820, the UE 802 may decode the second DCI portion. The UE may decode the second DCI portion with a second channel coding.

At 822, the UE 802 and the base station 804 may communicate with each other. For example, the UE 802 may transmit or receive communication with the base station 804. The UE may transmit or receive communication with the base station 804 using resources scheduled in the second DCI portion.

Figure 9:
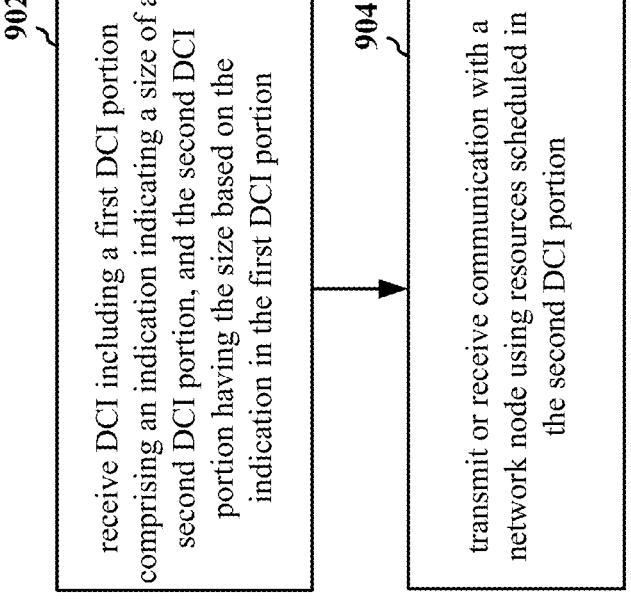
FIG. 9 is a flowchart of a method of wireless communication.

FIG. 9 is a flowchart 900 of a method of wireless communication. The method may be performed by a UE (e.g., the UE 104; the apparatus 1104). One or more of the illustrated operations may be omitted, transposed, or contemporaneous. The method may provide a UE with two-stage PDCCH with a dynamic DCI size.

At 902, the UE may receive DCI. For example, 902 may be performed by DCI component 198 of apparatus 1104. The UE may receive the DCI including a first DCI portion and a second DCI portion. The first DCI portion may comprise an indication indicating a size of a second DCI portion. The second DCI portion may have the size based on the indication in the first DCI portion. In some aspects, the first DCI portion may have a fixed size and the second DCI portion may have a variable size based on the indication in the first DCI portion. The variable size may be based on a number of cells scheduled in the DCI. In some aspects, the first DCI portion may be mapped to resources based at least on a number of modulated symbols for the first DCI portion and resource element groups associated with a PDCCH candidate. In some aspects, a number of the resource element groups associated with the PDCCH candidate for mapping the first DCI portion may be selected from a first OFDM symbol within a PDCCH monitoring occasion. In some aspects, a number of the resource element groups associated with the PDCCH candidate for mapping the first DCI portion may be based on a spacing of the resource element groups. In some aspects, the second DCI portion may be mapped on remaining resources of the resource element groups associated with the PDCCH candidate after mapping the first DCI portion.

At 904, the UE may transmit or receive communication with a network entity. For example, 904 may be performed by DCI component 198 of apparatus 1104. The UE may transmit or receive communication with the network entity using resources scheduled in the second DCI portion.

FIG. 10 is a flowchart 1000 of a method of wireless communication. The method may be performed by a UE (e.g., the UE 104; the apparatus 1104). One or more of the illustrated operations may be omitted, transposed, or contemporaneous. The method may provide a UE with two-stage PDCCH with a dynamic DCI size.

At 1002, the UE may transmit a capability indication that the UE supports a capability for a maximum number of PDCCH candidates having a dynamic DCI size indication across all search space sets (SSS) and aggregation levels within a PDCCH monitoring occasion. For example, 1002 may be performed by DCI component 198 of apparatus 1104. In some aspects, the maximum number of the PDCCH candidates having the dynamic DCI size indication may be based on a period of time spanning a slot for slot based PDCCH monitoring, or a span for span based PDCCH monitoring.

At 1004, the UE may receive RRC signaling indicating a first DCI size of the first DCI portion. For example, 1004 may be performed by DCI component 198 of apparatus 1104. The first DCI size of the first DCI portion may be from a defined set of sizes.

At 1006, the UE may receive RRC signaling indicating an association between a code block length of the first DCI portion and the aggregation level of the PDCCH. For example, 1006 may be performed by DCI component 198 of apparatus 1104. In some aspects, the first DCI portion comprises the code block length from a set of multiple code block lengths based on an association to an aggregation level for a PDCCH. In some aspects, the code block length of the first DCI portion may be configured to provide a first link performance that corresponds to a second link performance of the second DCI portion. In some aspects, an association between the code block length of the first DCI portion and the aggregation level of the PDCCH is defined.

At 1008, the UE may receive DCI. For example, 1008 may be performed by DCI component 198 of apparatus 1104. The UE may receive the DCI including a first DCI portion and a second DCI portion. The first DCI portion may comprise an indication indicating a size of a second DCI portion. The second DCI portion may have the size based on the indication in the first DCI portion. In some aspects, the first DCI portion may have a fixed size and the second DCI portion may have a variable size based on the indication in the first DCI portion. The variable size may be based on a number of cells scheduled in the DCI. In some aspects, the first DCI portion may be mapped to resources based at least on a number of modulated symbols for the first DCI portion and resource element groups associated with a PDCCH candidate. In some aspects, a number of the resource element groups associated with the PDCCH candidate for mapping the first DCI portion may be selected from a first OFDM symbol within a PDCCH monitoring occasion. In some aspects, a number of the resource element groups associated with the PDCCH candidate for mapping the first DCI portion may be based on a spacing of the resource element groups. In some aspects, the second DCI portion may be mapped on remaining resources of the resource element groups associated with the PDCCH candidate after mapping the first DCI portion.

At 1010, the UE may decode the first DCI portion. For example, 1010 may be performed by DCI component 198 of apparatus 1104. The UE may decode the first DCI portion with a first channel coding.

At 1012, the UE may decode the second DCI portion. For example, 1012 may be performed by DCI component 198 of apparatus 1104. The UE may decode the second DCI portion with a second channel coding.

At 1014, the UE may transmit or receive communication with a network entity. For example, 1014 may be performed by DCI component 198 of apparatus 1104. The UE may transmit or receive communication with the network entity using resources scheduled in the second DCI portion.

Figure 11:
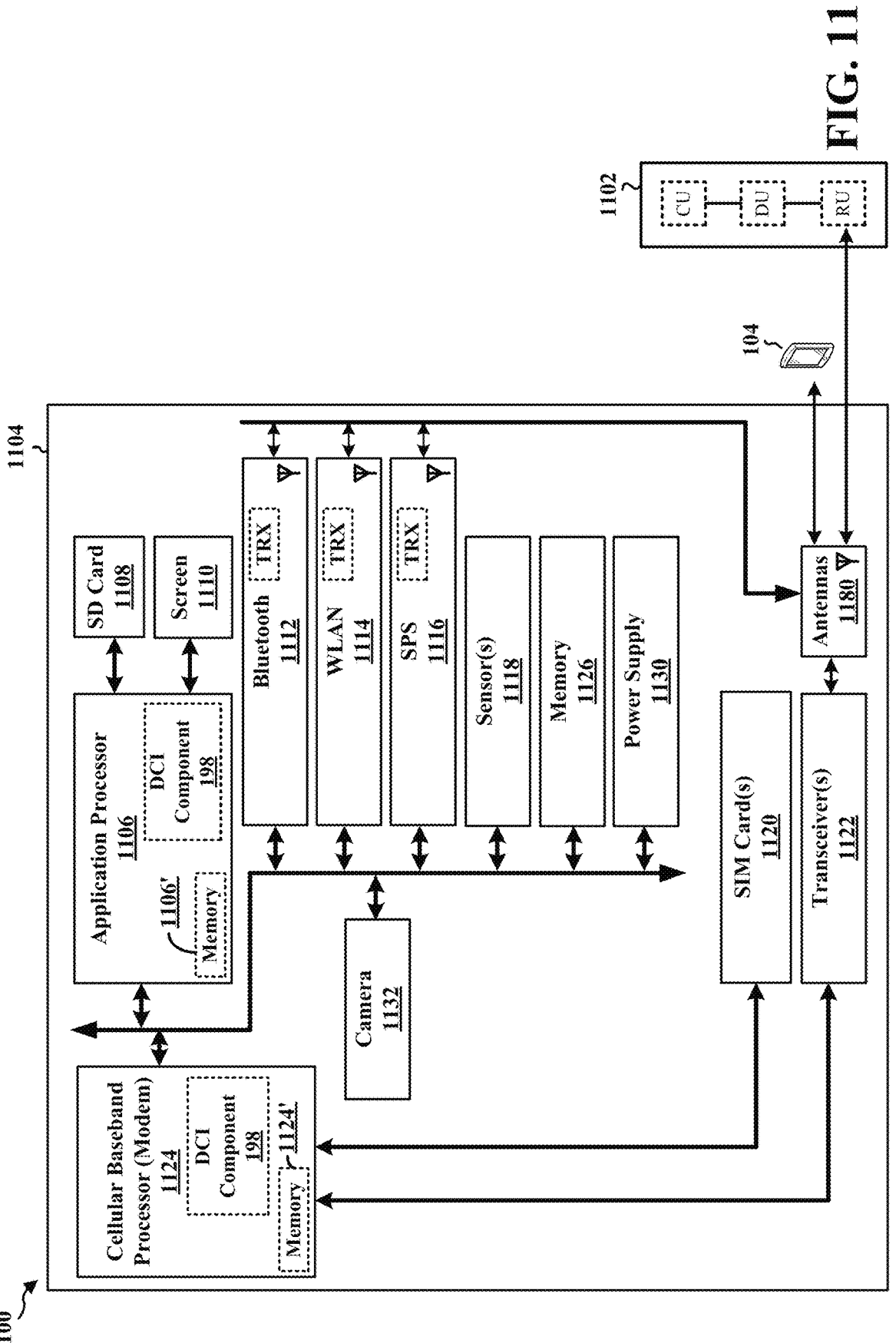
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the component 198 is configured to receive DCI including a first DCI portion comprising an indication indicating a size of a second DCI portion, and the second DCI portion having the size based on the indication in the first DCI portion; and transmit or receive communication with a network entity using resources scheduled in the second DCI portion. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for receiving DCI including a first DCI portion comprising an indication indicating a size of a second DCI portion, and the second DCI portion having the size based on the indication in the first DCI portion. The apparatus includes means for transmitting or receiving communication with a network node using resources scheduled in the second DCI portion. The apparatus further includes means for receiving RRC signaling indicating a first DCI size of the first DCI portion from a defined set of sizes. The apparatus further includes means for decoding the first DCI portion with a first channel coding. The apparatus further includes means for decoding the second DCI portion with a second channel coding. The apparatus further includes means for receiving an RRC signaling indicating an association between the code block length of the first DCI portion and the aggregation level of the PDCCH. The apparatus further includes means for transmitting a capability indication that the UE supports a capability for a maximum number of PDCCH candidates having a dynamic DCI size indication across all SSS and aggregation levels within a PDCCH monitoring occasion. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 12 is a flowchart 1200 of a method of wireless communication. The method may be performed by a base station (e.g., the base station 102; the network entity 1402. One or more of the illustrated operations may be omitted, transposed, or contemporaneous. The method may provide a UE with two-stage PDCCH with a dynamic DCI size.

At 1202, the network entity may provide DCI including a first DCI portion and a second DCI portion. For example, 1202 may be performed by DCI component 199 of network entity 1402. The first DCI portion may comprise an indication indicating a size of a second DCI portion. The second DCI portion may have the size based on the indication in the first DCI portion. In some aspects, the first DCI portion may have a fixed size and the second DCI portion may have a variable size based on the indication in the first DCI portion. The variable size may be based on a number of cells scheduled in the DCI. In some aspects, the first DCI portion may be mapped to resources based at least on a number of modulated symbols for the first DCI portion and resource element groups associated with a PDCCH candidate. In some aspects, a number of the resource element groups associated with the PDCCH candidate for mapping the first DCI portion may be selected from a first OFDM symbol within a PDCCH monitoring occasion. In some aspects, a number of the resource element groups associated with the PDCCH candidate for mapping the first DCI portion may be based on a spacing of the resource element groups. In some aspects, the second DCI portion may be mapped on remaining resources of the resource element groups associated with the PDCCH candidate after mapping the first DCI portion.

At 1204, the network entity may communicate with a UE. For example, 1204 may be performed by DCI component 199 of network entity 1402. The network entity may communicate with the UE using resources scheduled in the second DCI portion.

FIG. 13 is a flowchart 1300 of a method of wireless communication. The method may be performed by a base station (e.g., the base station 102; the network entity 1402. One or more of the illustrated operations may be omitted, transposed, or contemporaneous. The method may provide a UE with two-stage PDCCH with a dynamic DCI size.

At 1302, the network entity may obtain a capability indication that the UE supports a capability for a maximum number of PDCCH candidates having a dynamic DCI size indication across all SSS and aggregation levels within a PDCCH monitoring occasion. For example, 1302 may be performed by DCI component 199 of network entity 1402. In some aspects, the maximum number of the PDCCH candidates having the dynamic DCI size indication is based on a period of time spanning a slot for slot based PDCCH monitoring, or a span or span based PDCCH monitoring.

At 1304, the network entity may provide RRC signaling indicating a first DCI size of the first DCI portion. For example, 1304 may be performed by DCI component 199 of network entity 1402. The first DCI size of the first DCI portion may be from a defined set of sizes.

At 1306, the network entity may provide RRC signaling indicating an association between the code block length of the first DCI portion and the aggregation level of the PDCCH. For example, 1306 may be performed by DCI component 199 of network entity 1402. In some aspects, the first DCI portion may comprise a code block length from a set of multiple code block lengths based on an association to an aggregation level for a PDCCH. In some aspects, the code block length of the first DCI portion may be configured to provide a first link performance that corresponds to a second link performance of the second DCI portion. In some aspects, an association between the code block length of the first DCI portion and the aggregation level of the PDCCH is defined.

At 1308, the network entity may encode the first DCI portion. For example, 1308 may be performed by DCI component 199 of network entity 1402. The network entity may encode the first DCI portion with a first channel coding.

At 1310, the network entity may encode the second DCI portion. For example, 1310 may be performed by DCI component 199 of network entity 1402. The network entity may encode the second DCI portion with a second channel coding.

At 1312, the network entity may provide DCI including a first DCI portion and a second DCI portion. For example, 1312 may be performed by DCI component 199 of network entity 1402. The first DCI portion may comprise an indication indicating a size of a second DCI portion. The second DCI portion may have the size based on the indication in the first DCI portion. In some aspects, the first DCI portion may have a fixed size and the second DCI portion may have a variable size based on the indication in the first DCI portion. The variable size may be based on a number of cells scheduled in the DCI. In some aspects, the first DCI portion may be mapped to resources based at least on a number of modulated symbols for the first DCI portion and resource element groups associated with a PDCCH candidate. In some aspects, a number of the resource element groups associated with the PDCCH candidate for mapping the first DCI portion may be selected from a first OFDM symbol within a PDCCH monitoring occasion. In some aspects, a number of the resource element groups associated with the PDCCH candidate for mapping the first DCI portion may be based on a spacing of the resource element groups. In some aspects, the second DCI portion may be mapped on remaining resources of the resource element groups associated with the PDCCH candidate after mapping the first DCI portion.

At 1314, the network entity may communicate with a UE. For example, 1314 may be performed by DCI component 199 of network entity 1402. The network entity may communicate with the UE using resources scheduled in the second DCI portion.

Figure 14:
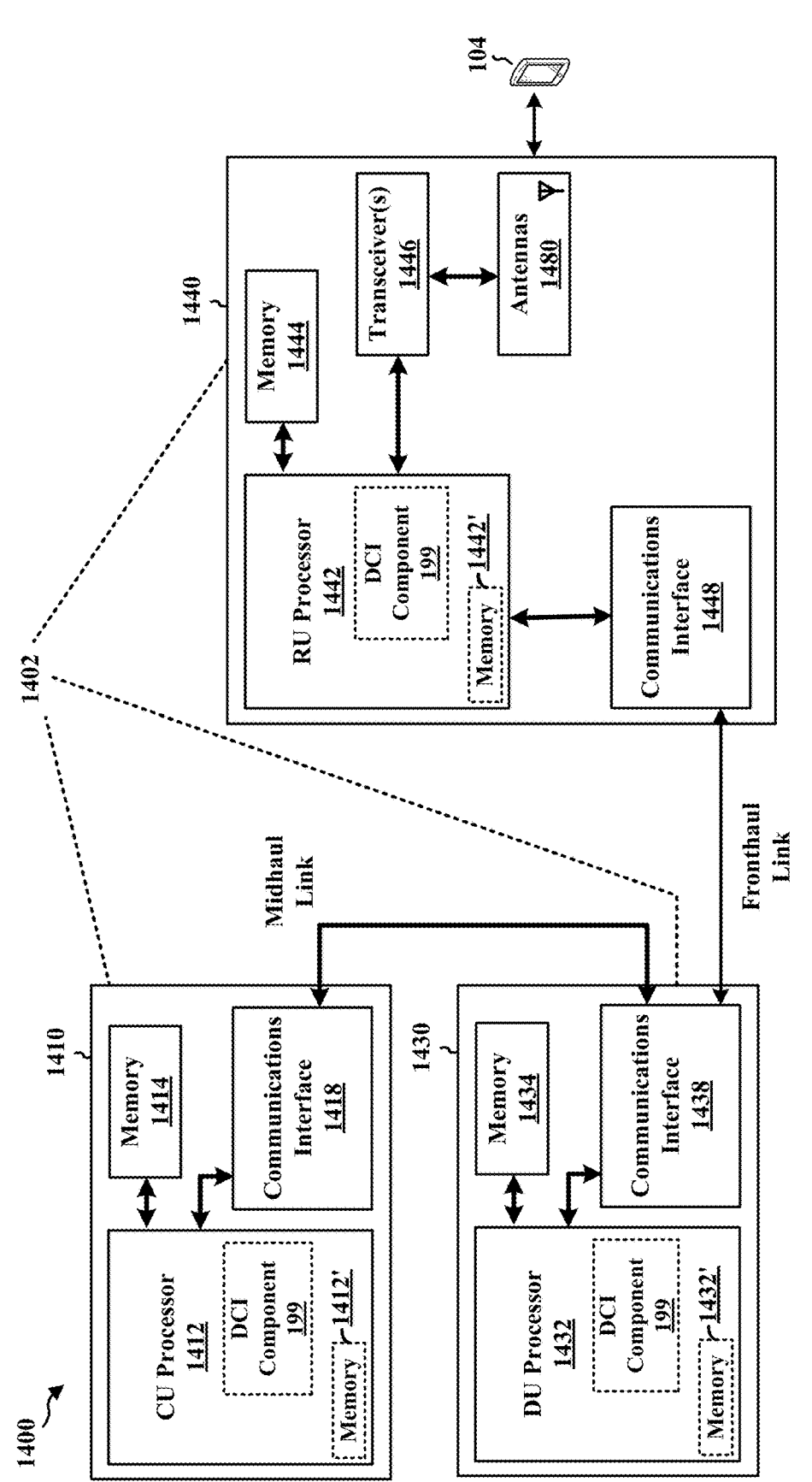
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to provide DCI including a first DCI portion comprising an indication indicating a size of a second DCI portion, and the second DCI portion having the size based on the indication in the first DCI portion; and communicate with a UE using resources scheduled in the second DCI portion. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for providing DCI including a first DCI portion comprising an indication indicating a size of a second DCI portion, and the second DCI portion having the size based on the indication in the first DCI portion. The network entity includes means for communicating with a UE using resources scheduled in the second DCI portion. The network entity further includes means for providing RRC signaling indicating a first DCI size of the first DCI portion from a defined set of sizes. The network entity further includes means for encoding the first DCI portion with a first channel coding. The network entity further includes means for encoding the second DCI portion with a second channel coding. The network entity further includes means for providing an RRC signaling indicating an association between the code block length of the first DCI portion and the aggregation level of the PDCCH. The network entity further includes means for obtaining a capability indication that the UE supports a capability for a maximum number of PDCCH candidates having a dynamic DCI size indication across all SSS and aggregation levels within a PDCCH monitoring occasion. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Aspects presented herein provide a configuration for two-stage PDCCH with a dynamic DCI size indication. A UE may receive a DCI having a first DCI portion and a second DCI portion, where the first DCI portion comprises an indication that indicates a size of the second DCI portion, such that the UE transmits or receives communications with a base station based on resources scheduled in the second DCI portion. At least one advantage of the disclosure is that the size of a DCI may be dynamically adjusted based on a number of cells that are scheduled together.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mecha-nism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE comprising receiving DCI including a first DCI portion comprising an indication indicating a size of a second DCI portion, and the second DCI portion having the size based on the indication in the first DCI portion; and transmitting or receive communication with a network entity using resources scheduled in the second DCI portion.

Aspect 2 is the method of aspect 1, further includes that the first DCI portion has a fixed size and the second DCI portion has a variable size based on the indication in the first DCI portion, wherein the variable size is based on a number of cells scheduled in the DCI.

Aspect 3 is the method of any of aspects 1 and 2, further including receiving RRC signaling indicating a first DCI size of the first DCI portion from a defined set of sizes.

Aspect 4 is the method of any of aspects 1-3, further including decoding the first DCI portion with a first channel coding; and decoding the second DCI portion with a second channel coding.

Aspect 5 is the method of any of aspects 1-4, further includes that the first DCI portion comprises a code block length from a set of multiple code block lengths based on an association to an aggregation level for a PDCCH.

Aspect 6 is the method of any of aspects 1-5, further includes that the code block length of the first DCI portion is configured to provide a first link performance that corresponds to a second link performance of the second DCI portion.

Aspect 7 is the method of any of aspects 1-6, further includes that the association between the code block length of the first DCI portion and the aggregation level of the PDCCH is defined.

Aspect 8 is the method of any of aspects 1-7, further including receiving an RRC signaling indicating the association between the code block length of the first DCI portion and the aggregation level of the PDCCH.

Aspect 9 is the method of any of aspects 1-8, further includes that the first DCI portion is mapped to resources based at least on a number of modulated symbols for the first DCI portion and resource element groups associated with a PDCCH candidate.

Aspect 10 is the method of any of aspects 1-9, further includes that a number of the resource element groups associated with the PDCCH candidate for mapping the first DCI portion is selected from a first OFDM symbol within a PDCCH monitoring occasion.

Aspect 11 is the method of any of aspects 1-10, further includes that a number of the resource element groups associated with the PDCCH candidate for mapping the first DCI portion is based on a spacing of the resource element groups.

Aspect 12 is the method of any of aspects 1-11, further includes that the second DCI portion is mapped on remaining resources of the resource element groups associated with the PDCCH candidate after mapping the first DCI portion.

Aspect 13 is the method of any of aspects 1-12, further including transmitting a capability indication that the UE supports a capability for a maximum number of PDCCH candidates having a dynamic DCI size indication across all SSS and aggregation levels within a PDCCH monitoring occasion, wherein the maximum number of the PDCCH candidates having the dynamic DCI size indication is based on a period of time spanning a slot for slot based PDCCH monitoring, or a span for span based PDCCH monitoring.

Aspect 14 is an apparatus for wireless communication at a UE including at least one processor coupled to a memory and at least one transceiver, the at least one processor configured to implement any of Aspects 1-13.

Aspect 15 is an apparatus for wireless communication at a UE including means for implementing any of Aspects 1-13.

Aspect 16 is a computer-readable medium storing computer executable code, where the code when executed by a processor causes the processor to implement any of Aspects 1-13.

Aspect 17 is a method of a wireless communication at a network entity comprising providing DCI including a first DCI portion comprising an indication indicating a size of a second DCI portion, and the second DCI portion having the size based on the indication in the first DCI portion; and communicating with a UE using resources scheduled in the second DCI portion.

Aspect 18 is the method of aspect 17, further includes that the first DCI portion has a fixed size and the second DCI portion has a variable size based on the indication in the first DCI portion, wherein the variable size is based on a number of cells scheduled in the DCI.

Aspect 19 is the method of any of aspects 17 and 18, further including providing RRC signaling indicating a first DCI size of the first DCI portion from a defined set of sizes.

Aspect 20 is the method of any of aspects 17-19, further including encoding the first DCI portion with a first channel coding; and encoding the second DCI portion with a second channel coding.

Aspect 21 is the method of any of aspects 17-20, further includes that the first DCI portion comprises a code block length from a set of multiple code block lengths based on an association to an aggregation level for a PDCCH.

Aspect 22 is the method of any of aspects 17-21, further includes that the code block length of the first DCI portion is configured to provide a first link performance that corresponds to a second link performance of the second DCI portion.

Aspect 23 is the method of any of aspects 17-22, further includes that the association between the code block length of the first DCI portion and the aggregation level of the PDCCH is defined.

Aspect 24 is the method of any of aspects 17-23, further including providing an RRC signaling indicating the association between the code block length of the first DCI portion and the aggregation level of the PDCCH.

Aspect 25 is the method of any of aspects of 17-24, further includes that the first DCI portion is mapped to resources based at least on a number of modulated symbols for the first DCI portion and resource element groups associated with a PDCCH candidate.

Aspect 26 is the method of any of aspects 17-25, further includes that a number of the resource element groups associated with the PDCCH candidate for mapping the first DCI portion is selected from a first OFDM symbol within a PDCCH monitoring occasion.

Aspect 27 is the method of any of aspects 17-26, further includes that a number of the resource element groups associated with the PDCCH candidate for mapping the first DCI portion is based on a spacing of the resource element groups.

Aspect 28 is the method of any of aspects 17-27, further includes that the second DCI portion is mapped on remaining resources of the resource element groups associated with the PDCCH candidate after mapping the first DCI portion.

Aspect 29 is the method of any of aspects 17-28, further including obtaining a capability indication that the UE supports a capability for a maximum number of PDCCH candidates having a dynamic DCI size indication across all SSS and aggregation levels within a PDCCH monitoring occasion, wherein the maximum number of the PDCCH candidates having the dynamic DCI size indication is based on a period of time spanning a slot for slot based PDCCH monitoring, or a span or span based PDCCH monitoring.

Aspect 30 is an apparatus for wireless communication at a network entity including at least one processor coupled to a memory and at least one transceiver, the at least one processor configured to implement any of Aspects 17-29.

Aspect 31 is an apparatus for wireless communication at a network entity including means for implementing any of Aspects 17-29.

Aspect 32 is a computer-readable medium storing computer executable code, where the code when executed by a processor causes the processor to implement any of Aspects 17-29.

What is claimed is:

1. An apparatus for wireless communication at a user equipment (UE), comprising:

memory; and at least one processor coupled to the memory and, based at least in part on information stored in the memory, the at least one processor is configured to:

receive downlink control information (DCI) including:

a first DCI portion comprising an indication indicating a size of a second DCI portion, wherein the first DCI portion has a fixed size, and the second DCI portion having the size based on the indication in the first DCI portion, wherein the second DCI portion has a variable size based on the indication in the first DCI portion; and transmit or receive communication with a network entity using resources scheduled in the second DCI portion.

2. The apparatus of claim 1, further comprising a transceiver coupled to the at least one processor.

3. The apparatus of claim 1, wherein the variable size is based on a number of cells scheduled in the DCI.

4. The apparatus of claim 1, the at least one processor configured to:

receive radio resource control (RRC) signaling indicating a first DCI size of the first DCI portion from a defined set of sizes.

5. The apparatus of claim 1, the at least one processor configured to:

decode the first DCI portion with a first channel coding; and decode the second DCI portion with a second channel coding.

6. The apparatus of claim 1, wherein the first DCI portion comprises a code block length from a set of multiple code block lengths based on an association to an aggregation level for a physical downlink control channel (PDCCH).

7. The apparatus of claim 6, wherein the code block length of the first DCI portion is configured to provide a first link performance that corresponds to a second link performance of the second DCI portion.

8. The apparatus of claim 6, wherein the association between the code block length of the first DCI portion and the aggregation level of the PDCCH is defined.

9. The apparatus of claim 6, the at least one processor configured to:

receive an RRC signaling indicating the association between the code block length of the first DCI portion and the aggregation level of the PDCCH.

10. The apparatus of claim 1, wherein the first DCI portion is mapped to resources based at least on a number of modulated symbols for the first DCI portion and resource element groups associated with a physical downlink control channel (PDCCH) candidate.

11. The apparatus of claim 10, wherein a number of the resource element groups associated with the PDCCH candidate for mapping the first DCI portion is selected from a first orthogonal frequency division multiplex (OFDM) symbol within a PDCCH monitoring occasion.

12. The apparatus of claim 10, wherein a number of the resource element groups associated with the PDCCH candidate for mapping the first DCI portion is based on a spacing of the resource element groups.

13. The apparatus of claim 10, wherein the second DCI portion is mapped on remaining resources of the resource element groups associated with the PDCCH candidate after mapping the first DCI portion.

14. The apparatus of claim 1, the at least one processor configured to:

transmit a capability indication that the UE supports a capability for a maximum number of physical downlink control channel (PDCCH) candidates having a dynamic DCI size indication across all search space sets (SSS) and aggregation levels within a PDCCH monitoring occasion, wherein the maximum number of the PDCCH candidates having the dynamic DCI size indication is based on a period of time spanning a slot for slot based PDCCH monitoring, or a span for span based PDCCH monitoring.

15. A method of wireless communication of a user equipment (UE), comprising:

receiving downlink control information (DCI) including:
a first DCI portion comprising an indication indicating a size of a second DCI portion, wherein the first DCI portion has a fixed size, and
the second DCI portion having the size based on the indication in the first DCI portion, wherein the second DCI portion has a variable size based on the indication in the first DCI portion; and transmitting or receiving communication with a network entity using resources scheduled in the second DCI portion.

16. An apparatus for wireless communication at a network entity, comprising:

memory; and at least one processor coupled to the memory and, based at least in part on information stored in the memory, the at least one processor is configured to:

provide downlink control information (DCI) including:
a first DCI portion comprising an indication indicating a size of a second DCI portion, wherein the first DCI portion has a fixed size, and
the second DCI portion having the size based on the indication in the first DCI portion, wherein the second DCI portion has a variable size based on the indication in the first DCI portion; and communicate with a user equipment (UE) using resources scheduled in the second DCI portion.

17. The apparatus of claim 16, further comprising a transceiver coupled to the at least one processor.

18. The apparatus of claim 16, wherein the variable size is based on a number of cells scheduled in the DCI.

19. The apparatus of claim 16, the at least one processor configured to:

provide radio resource control (RRC) signaling indicating a first DCI size of the first DCI portion from a defined set of sizes.

20. The apparatus of claim 16, the at least one processor configured to:

encode the first DCI portion with a first channel coding; and encode the second DCI portion with a second channel coding.

21. The apparatus of claim 16, wherein the first DCI portion comprises a code block length from a set of multiple code block lengths based on an association to an aggregation level for a physical downlink control channel (PDCCH).

22. The apparatus of claim 21, wherein the code block length of the first DCI portion is configured to provide a first link performance that corresponds to a second link performance of the second DCI portion.

23. The apparatus of claim 21, wherein the association between the code block length of the first DCI portion and the aggregation level of the PDCCH is defined.

24. The apparatus of claim 21, the at least one processor configured to:

provide an RRC signaling indicating the association between the code block length of the first DCI portion and the aggregation level of the PDCCH.

25. The apparatus of claim 16, wherein the first DCI portion is mapped to resources based at least on a number of modulated symbols for the first DCI portion and resource element groups associated with a physical downlink control channel (PDCCH) candidate.

26. The apparatus of claim 25, wherein a number of the resource element groups associated with the PDCCH candidate for mapping the first DCI portion is selected from a first orthogonal frequency division multiplex (OFDM) symbol within a PDCCH monitoring occasion.

27. The apparatus of claim 25, wherein a number of the resource element groups associated with the PDCCH candidate for mapping the first DCI portion is based on a spacing of the resource element groups.

28. The apparatus of claim 25, wherein the second DCI portion is mapped on remaining resources of the resource element groups associated with the PDCCH candidate after mapping the first DCI portion.

29. The apparatus of claim 16, the at least one processor configured to:

obtain a capability indication that the UE supports a capability for a maximum number of physical downlink control channel (PDCCH) candidates having a dynamic DCI size indication across all search space sets (SSS) and aggregation levels within a PDCCH monitoring occasion, wherein the maximum number of the PDCCH candidates having the dynamic DCI size indication is based on a period of time spanning a slot for slot based PDCCH monitoring, or a span or span based PDCCH monitoring.

30. A method of wireless communication at a network entity, comprising:

providing downlink control information (DCI) including:

a first DCI portion comprising an indication indicating a size of a second DCI portion, wherein the first DCI portion has a fixed size, and the second DCI portion having the size based on the indication in the first DCI portion, wherein the second DCI portion has a variable size based on the indication in the first DCI portion; and communicating with a user equipment (UE) using resources scheduled in the second DCI portion.

\* \* \* \* \*